(12) United States Patent
West

(10) Patent No.: US 12,442,327 B1
(45) Date of Patent: Oct. 14, 2025

(54) SELF-BALANCING EIGHT-CYLINDER INTERNAL COMBUSTION ENGINE

(71) Applicant: Philip M. West, Highland Park, IL (US)

(72) Inventor: Philip M. West, Highland Park, IL (US)

( * ) Notice: Subject to any disclaimer, the term of this patent is extended or adjusted under 35 U.S.C. 154(b) by 0 days.

(21) Appl. No.: 18/765,829

(22) Filed: Jul. 8, 2024

(51) Int. Cl.
  *F02B 75/00* (2006.01)
  *F02B 75/24* (2006.01)
  *F02B 75/18* (2006.01)

(52) U.S. Cl.
  CPC ...... *F02B 75/24* (2013.01); *F02B 2075/1832* (2013.01)

(58) Field of Classification Search
  CPC .................. F02B 75/24; F02B 2075/1832
  USPC .............. 123/53.6, 53.5, 55.2, 55.5
  See application file for complete search history.

(56) References Cited

U.S. PATENT DOCUMENTS

| | | | | |
|---|---|---|---|---|
| 539,923 A * | 5/1895 | Roth | ...... | F02B 75/246 123/55.5 |
| 549,213 A * | 11/1895 | Roth | ...... | F02B 75/246 123/162 |
| 877,294 A * | 1/1908 | Chase et al. | ...... | F02B 75/246 123/55.5 |
| 2,131,595 A * | 9/1938 | Monti | ...... | F02B 75/246 123/48 B |
| 2,230,893 A * | 2/1941 | Bachle | ...... | F01M 1/06 123/196 R |
| 2,310,733 A * | 2/1943 | Duke | ...... | F01B 9/026 123/55.2 |
| 2,506,250 A * | 5/1950 | Taub | ...... | F02B 75/243 123/188.14 |
| 3,043,283 A * | 7/1962 | Vitale | ...... | F02B 75/246 123/70 R |
| 4,444,161 A * | 4/1984 | Williams | ...... | F01L 7/02 123/190.17 |
| 5,052,354 A * | 10/1991 | Kindaichi | ...... | F02B 75/243 123/196 CP |
| 5,873,339 A * | 2/1999 | Isogai | ...... | F01B 9/026 123/197.4 |
| 6,634,330 B2 * | 10/2003 | Matsuda | ...... | F01L 1/18 74/559 |
| 6,904,888 B1 * | 6/2005 | Heifets | ...... | F02B 75/24 123/197.1 |

(Continued)

*Primary Examiner* — Phutthiwat Wongwian
*Assistant Examiner* — Sherman D Manley

(57) ABSTRACT

Vibration is detrimental to an internal combustion engine and its mounting system. It can damage internal parts, attached accessories, and mounting fixtures. Vibration can also cause discomfort to vehicle occupants or equipment operators. Managing, reducing, or eliminating vibration often involves additional cost in the design and manufacture of an engine and/or its mounting system. The subject invention is a unique arrangement of the cylinders of an eight-cylinder internal combustion engine that completely balances the forces produced by the eight pistons. Vibration due to piston motion is eliminated without the use of additional internal balancing devices. Special mounting structures are no longer necessary. This arrangement can be used with equal success in air compressors, liquid pumps, external combustion engines, or any other device using the familiar piston/connecting rod/crankshaft mechanism and requiring eight cylinders.

1 Claim, 3 Drawing Sheets

(56) References Cited

U.S. PATENT DOCUMENTS

| | | | | |
|---|---|---|---|---|
| 7,191,742 | B2* | 3/2007 | Fuchs | F02B 75/24 |
| | | | | 123/55.2 |
| 8,453,611 | B2* | 6/2013 | Fuchs | F02B 61/04 |
| | | | | 123/41.31 |
| 10,837,357 | B1* | 11/2020 | Meckl | F02B 75/28 |
| 12,097,980 | B1* | 9/2024 | Arase | F01L 1/026 |
| 2007/0028867 | A1* | 2/2007 | Fuchs | F02B 61/04 |
| | | | | 123/55.2 |
| 2009/0223482 | A1* | 9/2009 | Schmitz | F02B 41/06 |
| | | | | 123/311 |
| 2015/0167548 | A1* | 6/2015 | Lippitt | F02B 41/08 |
| | | | | 123/445 |
| 2017/0363188 | A1* | 12/2017 | Hunstable | F02B 75/045 |
| 2019/0277190 | A1* | 9/2019 | Czira | F02B 75/22 |
| 2020/0355115 | A1* | 11/2020 | Carrillo Lostao | F01B 1/08 |
| 2023/0129546 | A1* | 4/2023 | Pressmar | F16C 5/00 |
| | | | | 123/197.4 |
| 2024/0044286 | A1* | 2/2024 | Fountain | F01L 1/022 |

* cited by examiner

SELF-BALANCING EIGHT-CYLINDER INTERNAL COMBUSTION ENGINE

TECHNICAL FIELD

The present disclosure relates to a unique arrangement of the cylinders in an eight-cylinder internal combustion engine. Embodiments discussed in this disclosure extend the use of this unique arrangement to air compressors, liquid pumps, external combustion engines, or any other device using the familiar piston/connecting rod/crankshaft mechanism and requiring eight cylinders.

BACKGROUND

The invention eliminates vibration due to piston motion in an eight-cylinder internal combustion engine through a unique arrangement of the cylinders and without the use of additional parts or contrivances such as balance shafts, linkages, levers, weights, or dummy pistons.

BRIEF SUMMARY

The subject invention is a unique arrangement of the cylinders of an eight-cylinder internal combustion engine such that the primary and secondary forces produced by the eight pistons are completely offset and balanced. Importantly, this includes the portion of the secondary forces often neglected by engineers. Vibration due to the reciprocating motion of the pistons is eliminated without resorting to the use of additional internal balancing devices. Vibration-absorbing external mounting structures are no longer necessary.

DETAILED DESCRIPTION OF THE INVENTION

Figure 1:
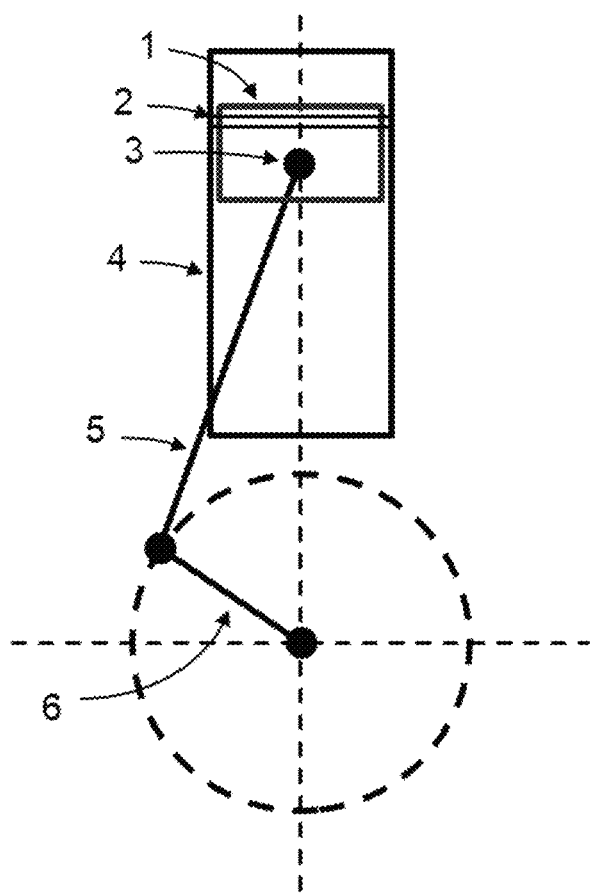
FIG. 1 provides an orientation of the familiar piston/connecting rod/crankshaft mechanism used to convert reciprocating motion into rotational motion. This mechanism can also be used to convert rotational motion into reciprocating motion.

The familiar piston/connecting rod/crankshaft mechanism is used in certain devices to convert reciprocating motion into rotational motion. This mechanism is most commonly seen in internal combustion engines. FIG. 1 shows the relationship between the piston 1, piston rings 2, wrist pin 3, cylinder 4, connecting rod 5, and crankshaft 6. In this perspective, the axis of the crankshaft 6 is perpendicular to the plane of the drawing. Vibrations emanating from internal combustion engines are chiefly due to the force generated by the reciprocating motion of the piston (or pistons in the case of multi-cylinder examples).

Vibration is detrimental to an engine and its mounting system. It can damage internal parts, attached accessories, and mounting fixtures. This damage can extend beyond the engine and mounting system and become evident in connected assemblies and structures. In addition, vibration can cause discomfort to vehicle occupants or equipment operators. Managing, reducing, or eliminating vibration, or mitigating the effects of vibration, often involves additional cost in the design and manufacture of an engine, its attached accessories, and/or its mounting system.

The force generated by the reciprocating motion of the piston, which for this purpose includes the piston, piston rings, wrist pin, and the upper portion of the connecting rod, can be represented in a mathematical formula. The formula has been known since the late 1800s. It was developed and used in the design of steam engines. It can be found, in different forms, in many mechanical engineering text books. Here is a common presentation of the formula:

$$\text{Total Force} = \left(mr\omega^2 \times \cos\theta\right) + \left(mr\omega^2 \times \left(\frac{n^2 \times \cos 2\theta + \sin^4\theta}{\left(n^2 - \sin^2\theta\right)^{3/2}}\right)\right)$$

Where: m=mass of the piston
r=crankshaft radius
ω=angular velocity of the crankshaft
θ=angle of crankshaft rotation
n=connecting rod length÷crankshaft radius The total force generated by a piston varies greatly as it reciprocates. On average, the first term in the force formula ("$mr\omega^2 \times \cos\theta$") is much larger than the second. The first term has come to be known as the primary force. Primary balance is the result of offsetting or cancelling the primary force. The second term has come to be known as the secondary force. Predictably, secondary balance is the result of offsetting or cancelling the secondary force. The secondary force term includes two trigonometric factors, shown in italics in the formula, that change the secondary force from a smooth wave function to one that is somewhat distorted and much more difficult to offset or cancel. The trigonometric factors can be time consuming to compute without the aid of a calculator or computer. Engineers in the late 1800s and early 1900s generally chose to ignore them. This is understandable. The factors themselves are normally small numbers. Steam engines and early internal combustion engines generally operated at modest speeds. As late as the 1940s, for example, a single cylinder oil field engine might operate at speeds of 300 revolutions per minute or less. Vibration reflected in the small trigonometric factors would have been inconsequential. In contrast are today's multi-cylinder engines which generally operate at much higher speeds. Increasing engine speed by a factor of 10 (say, from 300 revolutions per minute to 3,000) increases the maximum force reflected in the trigonometric factors by a factor of $10^2$ or 100. Yet even today, engineers often disregard these factors when attempting to balance the secondary force. Secondary balance might be asserted, when, in fact, an incremental force remains. This additional force does not have a commonly accepted name, but for the purpose of this disclosure will be called the "residual force." To completely balance the total force generated by a piston, it is therefore necessary to offset or cancel the primary and secondary forces, including the residual forces.

The optimum solution would use the total force generated by one piston, or set of pistons, to offset or cancel the total force generated by another piston, or set of pistons. This condition may be called self-balance. The typical single cylinder engine cannot be self-balanced because there is no second piston. Engines with an even number of cylinders can be made to self-balance if every two cylinders are aligned on precisely the same axis. Normally known as opposed piston engines, this design achieves self-balance but at the cost of additional internal parts and mechanically complex linkages. As a result, the use of opposed piston engines is generally reserved for special situations. The cylinder arrangements most commonly used in multi-cylinder engines do not allow for the self-balance of all forces. Engineers often resort to devices such as internal balance shafts or specialized external mounting fixtures to manage vibration. These devices add cost but, in most cases, can only partially control vibration. It is possible, however, to construct an eight-cylinder engine that will be completely self-balanced without the use of additional internal parts.

Figure 2:
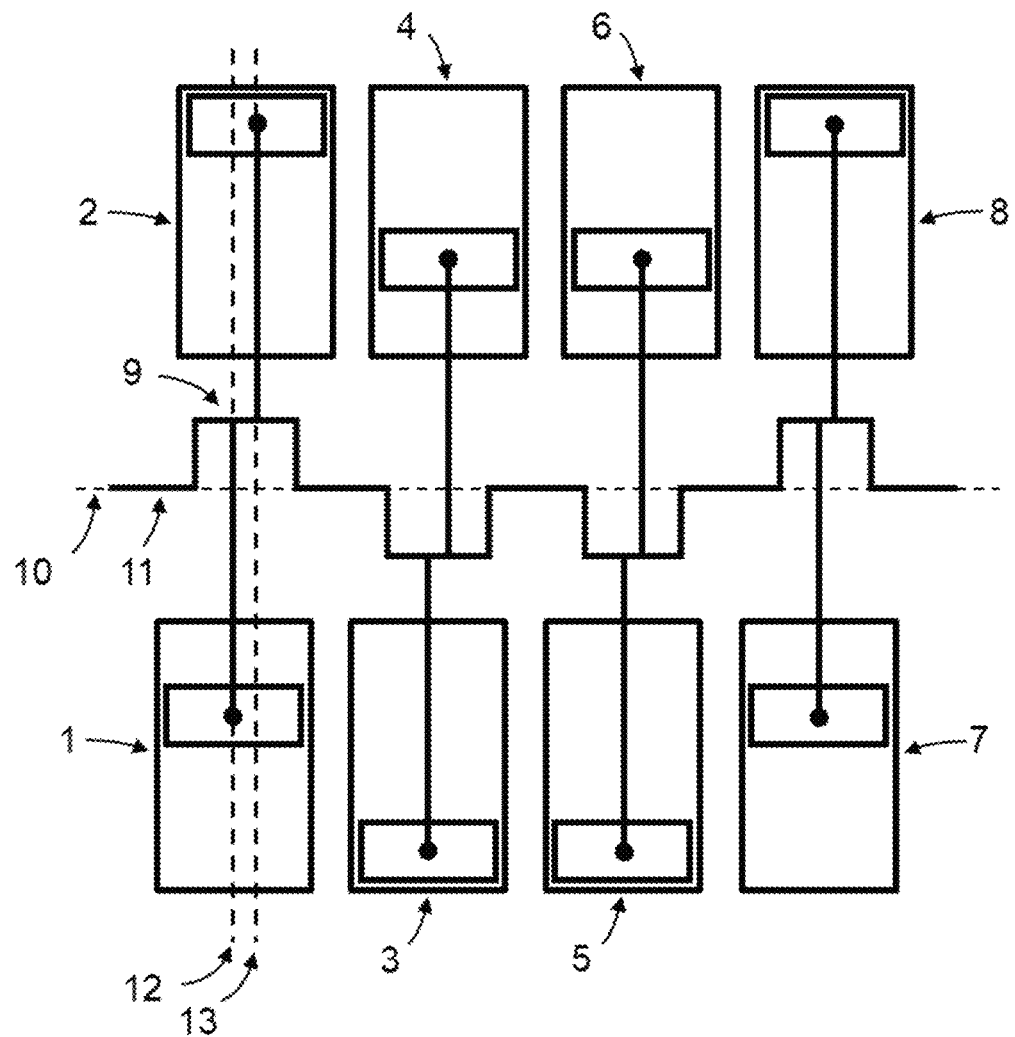
FIG. 2 shows the traditional arrangement of the cylinders in an eight-cylinder, flat-plane engine.

The solution begins with an arrangement of eight cylinders as shown in FIG. 2. This arrangement is not new or novel; it is simply the starting point. To improve clarity, the drawing is not to scale. The eight cylinders and their respective pistons and connecting rods are shown as 1 through 8. Piston rings are not shown. Connecting rod pair 1-2 share a common rod journal 9. This is typical for the remaining rod pairs 3-4, 5-6, and 7-8. The axes of the cylinders are parallel to one another, lie in the same plane (in this case the plane of the drawing), and are perpendicular to the axis 10 of the crankshaft 11. The rod journals also lie in the plane of the drawing. The spacing between cylinders 1, 3, 5, and 7 is identical to the spacing between cylinders 2, 4, 6, and 8. The distance between the axis 12 of cylinder 1 and the axis 13 of cylinder 2 is the same for the axes of cylinder pairs 3-4, 5-6, and 7-8. This arrangement of cylinders is sometimes referred to as a "flat" arrangement, a flat-plane v-8, or a 180° v-8. The crankshaft 11 is often referred to as a flat or 180° crankshaft.

Figure 3:
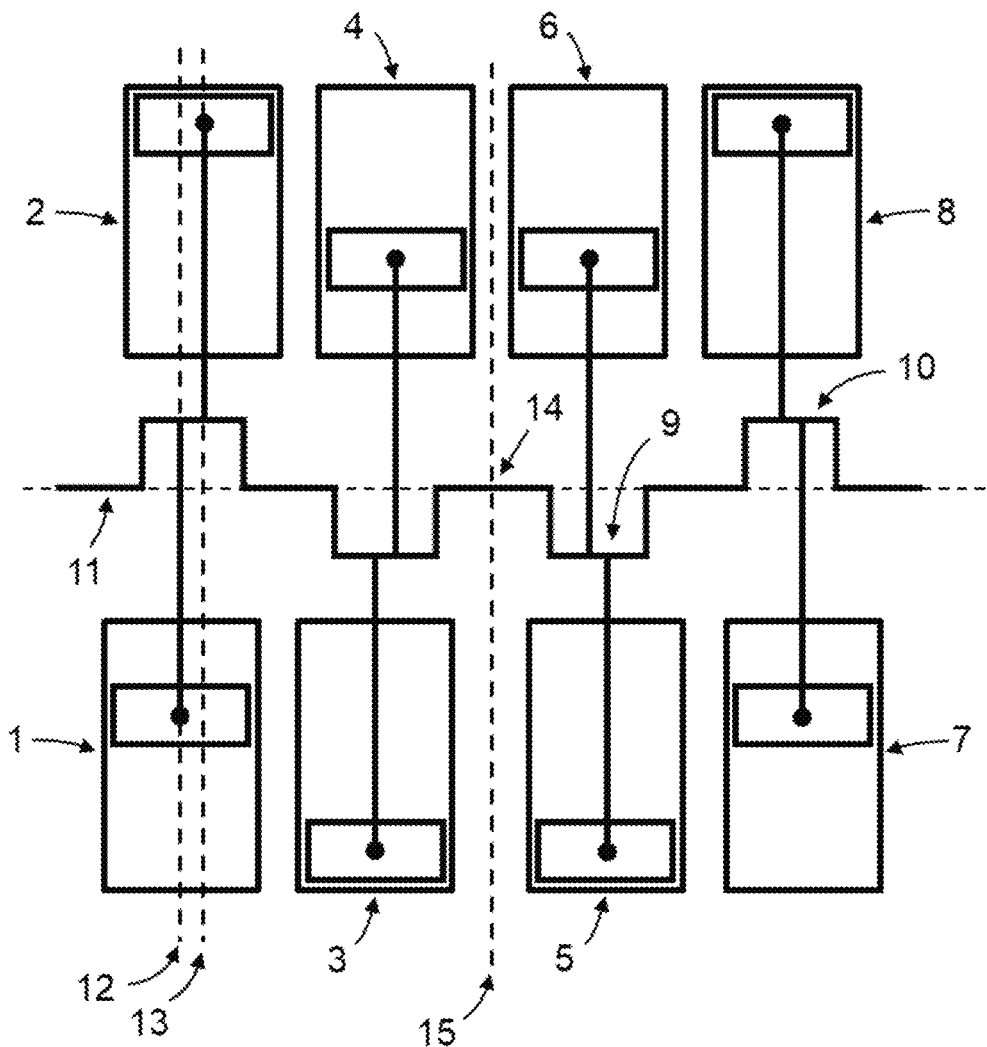
FIG. 3 shows the subject of this invention, which is a unique arrangement of the eight cylinders in a flat-plane engine.

The subject invention consists of a re-arrangement of the cylinders and connecting rods as shown in FIG. 3. Cylinders 1, 2, 3, 4, 6, and 8 remain untouched. For convenience, the perpendicular distance between the axis 12 of cylinder 1 and the axis 13 of cylinder 2 is defined as "x." Cylinders 5 and 7 are shifted to the right by an amount equal to 2x. In FIG. 2, cylinder 7 was inboard of cylinder 8. Now it is outboard. Crankshaft 11 is lengthened at its midpoint 14 by an amount equal to 1x. The connecting rods for cylinders 5-6 and 7-8 are reversed in their respective rod journals 9 and 10. In FIG. 2, the connecting rods were connected to the crankshaft in this order, left to right: 1-2-3-4-5-6-7-8. The new arrangement in FIG. 3 is 1-2-3-4-6-5-8-7. Taken together, these changes make the cylinder arrangement perfectly symmetrical around centerline 15.

The pistons, cylinders, and connecting rods can be of typical design, material, and manufacture. No unique or special modifications are required. The crankshaft must be lengthened, but otherwise requires no special material or manufacture.

The new arrangement produces a self-balancing engine because the forces generated by pistons 2-3 are completely offset and cancelled by pistons 5-8, while the forces generated by pistons 1-4 are offset by pistons 6-7. This includes the primary and secondary forces, where the secondary forces include the residual forces as defined earlier.

One embodiment of the invention is its use in internal combustion engines. The invention could be applied to any device using the familiar piston/connecting rod/crankshaft mechanism and requiring eight cylinders. As noted previously, the piston/connecting rod/crankshaft mechanism is used in certain devices to convert reciprocating motion into rotational motion. It is also used in certain devices to convert rotational motion into reciprocating motion. Air compressors and liquid pumps are such devices. An air compressor or liquid pump requiring eight cylinders and using the unique arrangement described in this disclosure would be self-balancing. These represent additional embodiments. Although somewhat rare today, an external combustion engine requiring eight cylinders and using the unique arrangement described in this disclosure is another embodiment.

The invention claimed is:

1. An internal combustion engine comprising:
   eight cylinders,
   each cylinder having a piston and a connecting rod,
   a flat plane crankshaft with four rod journals,
   wherein the eight cylinders are arranged such that four cylinders are located on each side of the flat plane crankshaft forming a 180(−) degree V-8, with
   the eight cylinders placed in symmetry around a centerline drawn perpendicular to the flat plane crankshaft, and wherein four cylinders with respective pistons and connecting rods are located on each side of the centerline,
   wherein the eight cylinders arrangement is configured to offset and cancel the primary, secondary, and residual forces produced by each of the eight cylinders and pistons because of a symmetry of the cylinders, pistons, and connecting rods,
   wherein each rod journal is connected to one connecting rod on each side of the flat plane crankshaft, and
   wherein the four cylinders located on one side of the flat plane crankshaft have their respective connecting rods closer to the centerline than the connecting rods of the cylinders located on the opposite side of the flat plane crankshaft.

\* \* \* \* \*